(12) United States Patent
Fonseca et al.

(10) Patent No.: US 6,963,584 B2
(45) Date of Patent: Nov. 8, 2005

(54) ENHANCED PRIVATE PARAMETER CAPABILITY IN IS-41 MESSAGES

(75) Inventors: Eric Marcelo Fonseca, Chicago, IL (US); Harold Robert Smith, Oakbrook Terrace, IL (US); Leslie Joseph Williams, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 903 days.

(21) Appl. No.: 09/817,882

(22) Filed: Mar. 26, 2001

(65) Prior Publication Data

US 2002/0136236 A1    Sep. 26, 2002

(51) Int. Cl.[7] .............................................. H04J 3/16
(52) U.S. Cl. ...................... 370/467; 370/466; 455/433
(58) Field of Search ............................... 370/466, 467, 370/310, 331, 347, 352, 280, 465, 489, 492, 370/496; 455/413, 419, 433, 461, 546, 414.1, 455/552.1, 422.1, 428, 432.2

(56) References Cited

U.S. PATENT DOCUMENTS

| 5,901,359 | A | * | 5/1999 | Malmstrom | ................. 455/461 |
|---|---|---|---|---|---|
| 5,933,784 | A | * | 8/1999 | Gallagher et al. | ........ 455/552.1 |
| 5,978,672 | A | * | 11/1999 | Hartmaier et al. | ........... 455/413 |
| 6,070,070 | A | * | 5/2000 | Ladue | ......................... 455/419 |
| 6,181,935 | B1 | * | 1/2001 | Gossman et al. | ............ 455/433 |
| 6,278,697 | B1 | * | 8/2001 | Brody et al. | ................. 370/310 |
| 6,301,242 | B1 | * | 10/2001 | Lindsay et al. | .............. 370/347 |
| 6,317,594 | B1 | * | 11/2001 | Gossman et al. | ......... 455/414.1 |
| 6,411,632 | B2 | * | 6/2002 | Lindgren et al. | ............ 370/466 |
| 6,445,716 | B1 | * | 9/2002 | Favichia et al. | ............. 370/466 |
| 6,738,647 | B1 | * | 5/2004 | Link, II | ....................... 455/564 |
| 2001/0002198 | A1 | * | 5/2001 | Lindgren et al. | ............ 370/466 |
| 2002/0009070 | A1 | * | 1/2002 | Lindsay et al. | .............. 370/347 |

* cited by examiner

Primary Examiner—Phirin Sam

(57) ABSTRACT

A method and apparatus for communicating between entities of a wireless cellular telecommunications system in protocols extended from the standard IS-41 Protocols. In accordance with the invention, different pairs of entities can communicate using different extended protocol dialects. The extended protocol dialects can include extra operations codes, extra parameter identifiers, or both. The extended protocol between each pair of entities of the system is assigned, but can be changed by an appropriate message. Advantageously, the basic spectrum for extended protocols can be enlarged by allowing different extended protocols between different entities and/or by switching extended protocol dialects between specific entities.

14 Claims, 3 Drawing Sheets

# ENHANCED PRIVATE PARAMETER CAPABILITY IN IS-41 MESSAGES

TECHNICAL FIELD

This invention relates to enhancements of signaling message protocols in cellular wireless telecommunications systems.

PROBLEM

A cellular wireless telecommunications system in accordance with the GSM Standard, (Global Standard for Mobile Telephony), is composed of a number of functional entities. These functional entities include an authentication center, a base station, an equipment identity register, a home location register, a mobile station, a mobile switching center, and a visitor location register. IS-41 is a Standard protocol used for communicating between such entities, and also for communication from such entities to other entities, such as the Public Switched Telephone Network (PSTN), the Integrated Services Digital Network (ISDN), and message centers. The IS-41 protocol has defined the content and format of all messages of a Standard set, but has left a relatively small message space for other messages not defined by the protocol. The content of these other messages is prearranged to be understood by the entities communicating these messages. Effectively, there is a private understanding concerning the meaning of these Non-Standard messages.

A problem of the prior art is the amount of space provided for such Non-Standard messages is too small to meet the growing needs for specialized communications.

SOLUTION

The above problem is alleviated and a contribution is made over the teachings of the prior art in accordance with this invention wherein the entities support communication of Non-Standard messages in a plurality of private protocols referred to hereinafter as Dialects, wherein there is one dialect which may occupy the full Non-Standard message space defined for each pair of communicating entities. Thus, for example, a Mobile Switching Center (MSC), may communicate in one dialect to a Visitor Location Register (VLR), and in a different dialect, with a Home Location Register (HLR). The sum of the different dialect messages between the VLR and the HLR, and the MSC, can thereby exceed the total dialect space allowed in the Standard. Advantageously, a plurality of different dialects can be supported for communications between different pairs of entities.

In accordance with the teachings of Applicants' invention, different dialects may be used in communicating between different versions of a particular type of entity. For example, a VLR that communicates with MSCs of different manufacturers may use one dialect for communicating with the MSC of one manufacturer, and a different dialect for communicating with the MSC of another manufacturer. Advantageously, there is no limit to the number of dialects that can be used subject only to the restriction that only a single dialect can be used between a specific pair of entities.

An entity is prepared to transmit and receive messages in different dialects; the dialect is selected according to the destination or source of a message, such that the dialect between a pair of entities is known to each of the communicating entities.

For special cases in which the same information is associated with different messages in different dialects, an entity can receive one of these messages in a first dialect, translate that particular message into a second dialect, and transmit that message to a receiving entity that communicates with the translating entity in the second dialect. Advantageously, even common elements of the dialect messages need not be encoded identically so that development of message protocols between specific pairs of entities can proceed independently.

BRIEF DESCRIPTION OF THE DRAWING(S)

DETAILED DESCRIPTION

Figure 1:
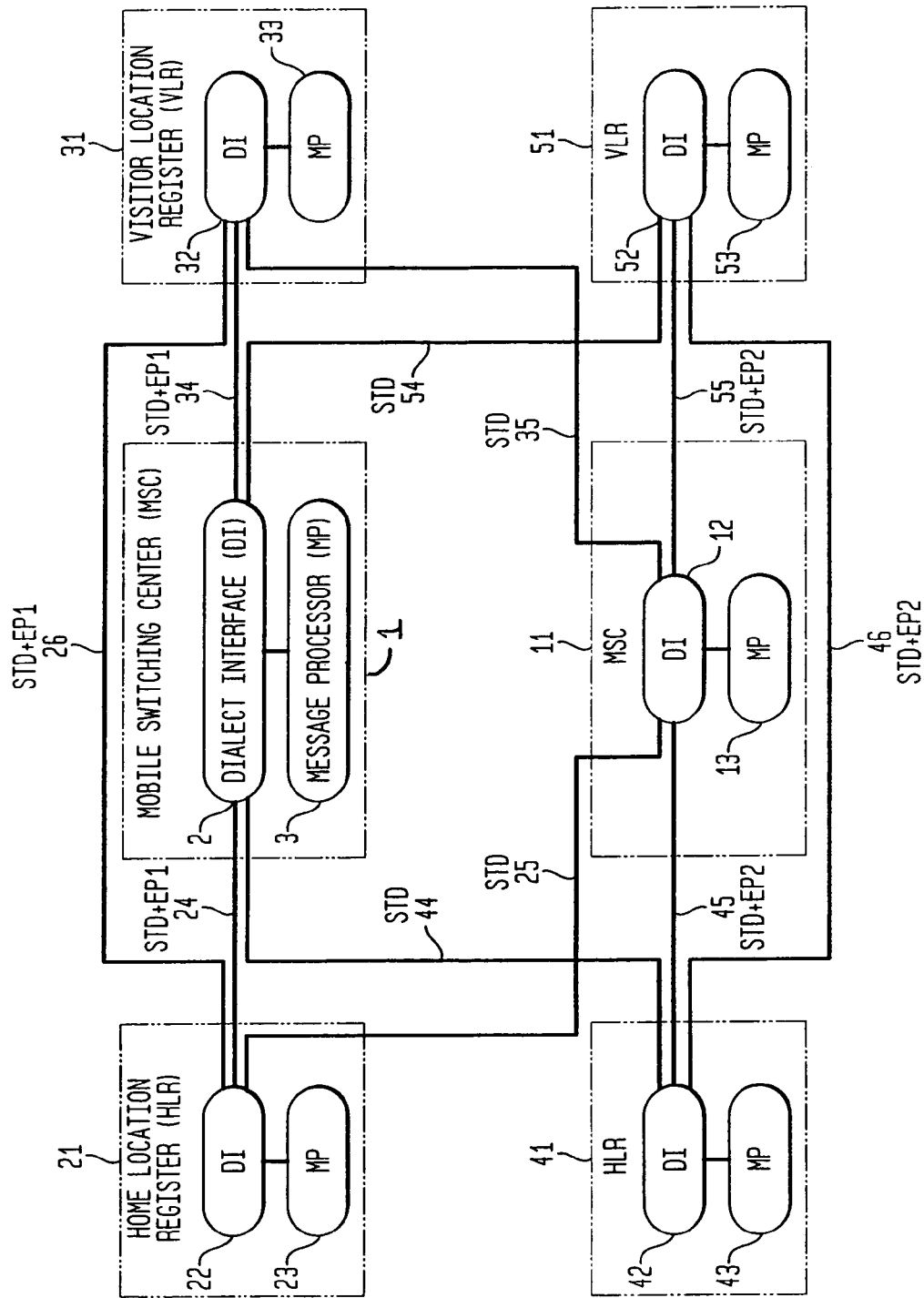
FIG. 1 is a block diagram illustrating communications among entities in accordance with the prior art.

FIG. 1 is a block diagram illustrating communications among a plurality of entities in accordance with the prior art. The entities shown are two Mobile Switching Centers (MSCs 1 and 11); these entities communicate with VLRs (31) and (51), and with HLRs (21) and (41). MSC (1) can communicate only in accordance with the Standard part of IS-41, plus Dialect extension portion 1 (EP1). MSC (11) can communicate only with the Standard portion of IS-41 and Dialect EP1. HLR (21) and VLR (31) can communicate only with the Standard portion of IS-41, plus Dialect EP1. The two HLRs can communicate with each other using the Standard IS-41 portion ("STD"). However, when HLR (41) communicates with MSC (1), it can only communicate using only STD. (The assumption here is that each dialect occupies the full space left over beyond STD. Obviously, if each dialect is sufficiently small, then a number of dialects can exist simultaneously on a non-overlap basis. However, the requirements of many applications fill most of, or all of, the message space left over beyond STD.) Similarly, VLR (31) can communicate with HLR (41) only using STD plus Dialect EP2.

Each unit has a dialect interface and a message processor. The dialect interface in the various entities of FIG. 1, can accept either STD plus EP1 (Units (1), (21), and (31)), or STD plus dialect EP2 (Units (11), (41), and (51)). Of course, all units can communicate using STD.

Figure 2:
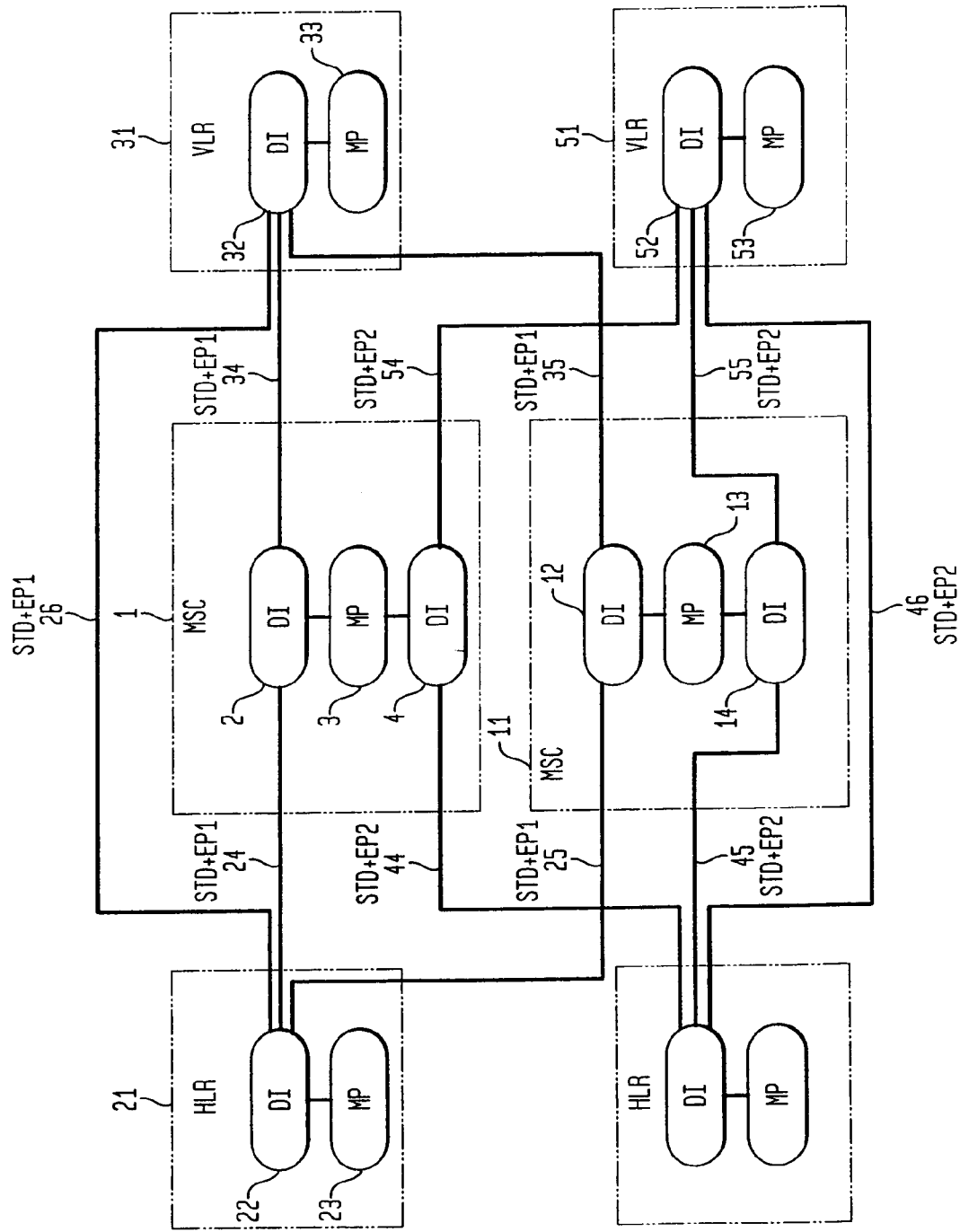
FIG. 2 illustrates communications among entities in accordance with Applicants' invention.

FIG. 2 illustrates Applicants' invention. To simplify the example, only MSC (1) and MSC (11) are equipped to handle two dialects, EP1 and EP2. Each of the MSCs has two dialect interfaces; MSC (1) has dialect interfaces (DIs) (2) and (4) for interfacing with STD plus dialect EP1, and STD plus dialect EP2, while MSC (11) has equivalent DIs (12) and (14) for interfacing with STD plus EP1 and STD plus EP2, respectively. The message processors (3) and (13) of MSC (1) and MSC (11), respectively, are each connected to two dialect interfaces, and can interpret the messages of STD, EP1, and EP2. Message processor (3) recognizes that messages outside the STD range received from DI (2) will be in dialect EP1, and that messages received outside the STD range from dialect interface (4) will be in dialect EP2. With this arrangement, HLR (21) and VLR (31) are both capable of communicating with both MSC (1) and MSC (11) in the extended protocol, comprising STD plus dialect EP1, and HLR (41) and VLR (51) can both communicate with MSC (1) and MSC (11), using the extended protocol of STD plus dialect EP2. If, in this example, it were necessary for HLR (21) to communicate with HLR (41), and for VLR (31) to communicate with VLR (51) using an extended protocol, it would be necessary to equip each of these VLRs and HLRs with two dialect interfaces in the same way that MSC (1) and MSC (11) are equipped with two dialect interfaces. While this example shows only two dialect interfaces for only some of the entities, the same principle can be applied to many more entities and many more types of entities, and with a much larger number of dialect interfaces in many of these entities. The result is a major enrichment in the ability of the entities to communicate with each other.

The systems of FIG. 2 can, for example, be systems of different carriers. MSC (1) and MSC (11) can belong to two different carriers, as can HLRs (21) and (41), and VLRs (31) and (51). EP2 can be the preferred dialect of the carrier having MSC (11), and EP1 can be the preferred dialect of the carrier having MSC (1). If it is necessary for MSC (11) to communicate with HLR (21), then MSC (11) can communicate in the preferred dialect EP1. If it is necessary for HLR (21) to communicate directly to HLR (41), or to communicate directly to VLR (51), then these messages can either go via the MSC (11) which can perform the translation between EP2 and EP1, or HLR (41) or VLR (51) can be equipped to process both the EP1 and the EP2 dialects. Further, it is not necessary to equip MSC (11) with the capability of transmitting and receiving messages in both the EP1 and the EP2 dialects, but any such messages can be transmitted via MSC (1), which can perform the necessary translation. The various dialect interfaces, such as DI (2) or DI (4) in MSC (1), are simply tables to allow for a translation between an operation code or a parameter code that is in the extended protocol of EP1 to identify the equivalent operation code or parameter identifier of EP2. Naturally, if a particular kind of operations code, or a particular kind of parameter exists in only one of the extended protocols, then such a translation will not be possible.

In accordance with one feature of Applicants' invention, it is possible for a unit to speak to another unit in two or more extended protocols. In order to switch from a basic extended protocol normally used for communications between two units, a special message containing a parameter that identifies the alternate protocol of the message(s) to be sent. Advantageously, such an arrangement allows for an essentially unlimited extended protocol.

Figure 3:
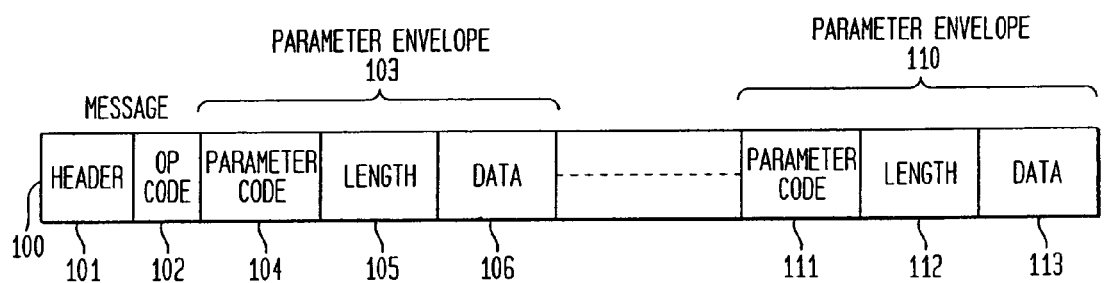
FIG. 3 illustrates details of a message.

FIG. 3 shows details of a typical message. The layout of the message of FIG. 3 is the same as that of the prior art; the difference is in the particular values of the operations code and the parameter identifier, and the significance of those operations codes and parameter identifiers which are not within the range of the basic standard code. The basic message (100) begins with a standard header (101), which includes such information such as the length of the entire message. This is followed by an operation code (102), (which may be part of the header), which identifies to the processing program the basic significance of the message. For an extended protocol, the range of the operations code is outside the range of the operations code for the standard part of the protocol, and is used to define operations beyond the standard operations. The operations code (102) is followed by a series of parameter envelopes (103), . . . , (110). Each parameter envelope includes standard control information, (such as the parameter code, data size, data of the envelope). The significance of the standard control information is the same for both the standard portion of the protocol and the extended protocol. The parameter code (104) is followed by a data size field parameter identifier (105), followed by the data field (106). If the value of the parameter identifier is within the range or values allowed by the standard protocol, then the significance of the parameter code is the same as the significance of that parameter code in the standard protocol. If the parameter code is outside the standard range, then the significance of the parameter code is defined in the tables defining the extended protocol. Note that a message can include an extended protocol operations code and/or one or more extended protocol parameter codes. Note further, that an operations code within the standard protocol range can be in the same message as a parameter code in the extended protocol range. Thus, messages may include standard or extended protocol operation codes, and standard or extended protocol identifiers.

The above is a description of one preferred embodiment of Applicants' invention, simplified by having only a small number of different entities. Other embodiments will be apparent to those of ordinary skill in the art without departing from the scope of the invention. The invention is limited only by the attached Claims.

What is claimed is:

1. In a wireless telecommunication system, a method of transmitting signaling messages among a plurality of entities, said signaling messages transmitted using a protocol having a standard portion for transmitting standard messages, and an extension portion for transmitting non-standard messages, comprising the steps of:

transmitting standard messages, using the standard portion of the protocol;

assigning to each pair of communicating entities, an extended protocol;

communicating between pairs of entities, using the assigned extended protocol; and in response to receipt of a message comprising data in an extension portion of said protocol, determining the source of the message, and interpreting the message in accordance with the extension portion of said protocol assigned for communications between a source and recipient entity;

wherein at least one entity can communicate in at least two different extension portions of said protocol.

2. The method of claim 1, wherein said at least one entity can translate between compatible messages in a first extension portion of said protocol and a second extension portion of said protocol.

3. The method of claim 1, wherein an extension portion of said protocol comprises at least one extension portion of said protocol operations code, not defined in the standard portion of the protocol.

4. The method of claim 1, wherein said assigned extension portion of said protocol comprises at least one parameter identifier not included in said standard portion.

5. The method of claim 4, wherein said extension portion of said protocol further comprises at least one operations code not included in said standard portion.

6. The method of claim 1, further comprising the step of transmitting a message for switching to a different extension portion of said protocol between the communicating entities.

7. The method of claim 1, wherein said standard protocol is an IS-41 Protocol.

8. In a wireless telecommunication system, apparatus for transmitting signaling messages among a plurality of entities, said signaling messages transmitted using a protocol having a standard portion for transmitting standard messages, and an extension portion for transmitting non-standard messages, comprising processor means for controlling execution of the following steps:

transmitting standard messages, using the standard portion of the protocol;

assigning to each pair of communicating entities, an extended protocol;

communicating between pairs of entities, using the extended protocol; and in response to receipt of a message comprising data in an extension portion of said protocol, determining the source of the message, and interpreting the message in accordance with the extension portion of said protocol assigned for communications between a source and recipient entity;

wherein at least one entity can communicate in at least two different extension portions of said protocol.

9. The apparatus of claim 8, wherein said at least one entity can translate between compatible messages in a first extension portion of said protocol and a second extension portion of said protocol.

10. The apparatus of claim 8, wherein an extension portion of said protocol comprises at least one extension portion of said protocol operations code, not defined in the standard portion of the protocol.

11. The apparatus of claim 8, wherein said assigned extension portion of said protocol comprises at least one parameter code not included in said standard portion.

12. The apparatus of claim 11, wherein said extension portion of said protocol further comprises at least one operations code not included in said standard portion.

13. The apparatus of claim 8, wherein said processor means are for further controlling the step of transmitting a message for switching to a different extension portion of said protocol between the communicating entities.

14. The apparatus of claim 8, wherein said standard protocol is an IS-41 Protocol.

* * * * *